July 6, 1926.

C. B. DURHAM 1,591,614

SHOCK ABSORBER

Filed June 23, 1924

Inventor
Cady B. Durham
By his Attorneys

Patented July 6, 1926.

1,591,614

UNITED STATES PATENT OFFICE.

CADY B. DURHAM, OF FLINT, MICHIGAN, ASSIGNOR TO GENERAL MOTORS CORPORATION, OF DETROIT, MICHIGAN, A CORPORATION OF DELAWARE.

SHOCK ABSORBER.

Application filed June 23, 1924. Serial No. 721,789.

This invention relates to shock absorbers and similar devices for controlling the spring action of vehicles, and is illustrated as embodied in a frictionally-operating device controlling the action of a cantilever spring. One feature of the invention relates to controlling such a spring by a device connected between the two connections from the spring to the frame. The device shown in the drawings also embodies features of novelty independently of this particular spring connection.

These and other features of the invention will be apparent from the following description of one illustrative embodiment shown in the accompanying drawings, in which.

Figure 1:
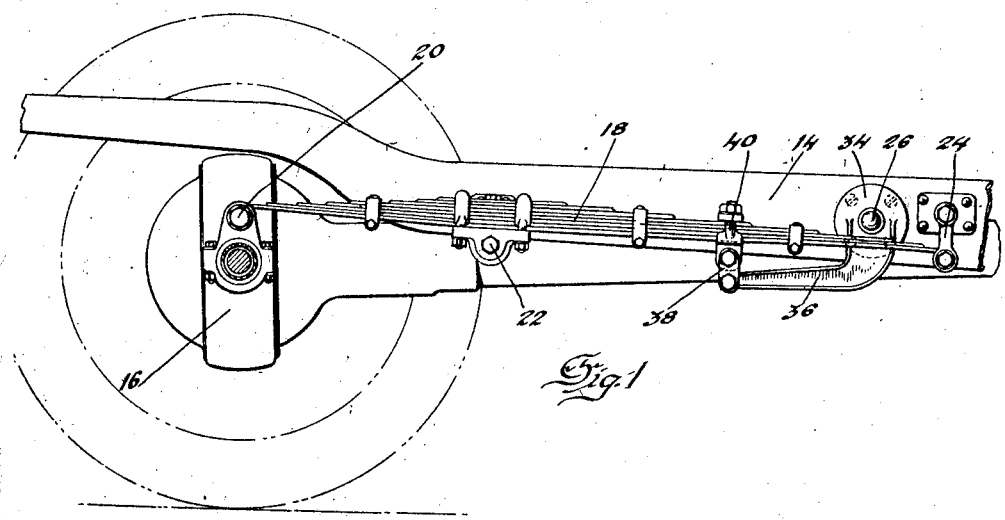
Figure 1 is a diagrammatic longitudinal vertical section of part of an automobile chassis, just inside the nearer wheel.
Figure 2:
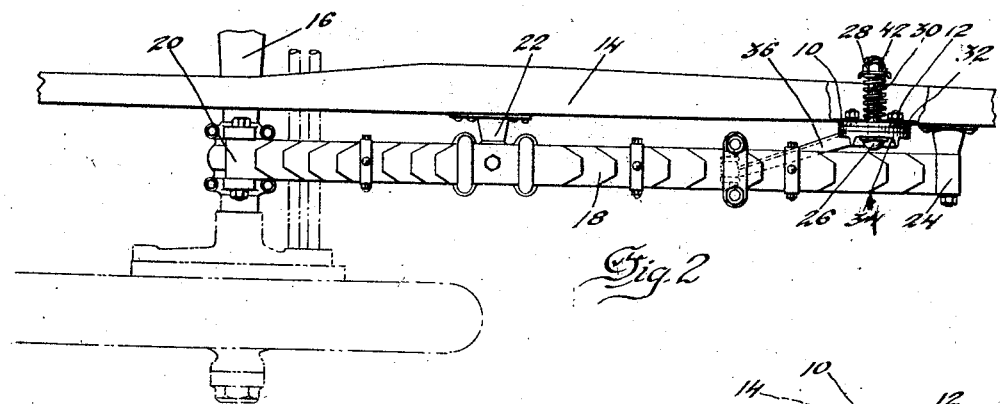
Figure 2 is a top plan view of one wheel and spring, with part of the chassis frame, and with the shock absorber in place.
Figure 3:
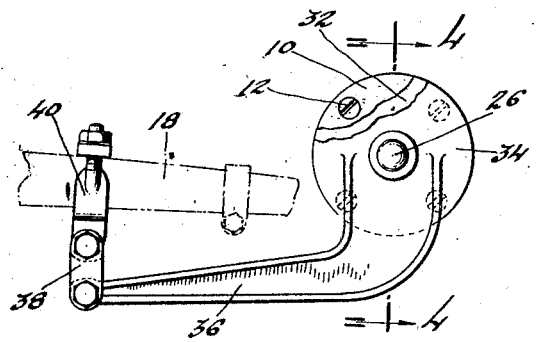
Figure 3 is a side elevation, partly broken away, of the shock absorber.
Figure 4:
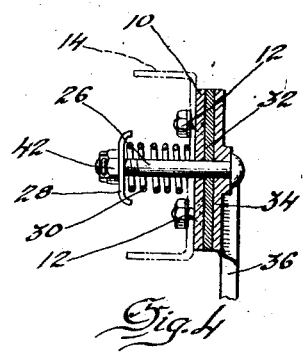
Figure 4 is a section on the line 4—4 of Figure 3, showing the mounting of the shock absorber on the chassis frame.

In the arrangement selected for illustration, my novel shock absorber comprises a disk 10 of friction material secured, by bolts 12 or otherwise, to the side member 14 of the chassis frame, the frame being supported on the rear axle 16 by cantilever springs 18. Each spring is pivotally connected to the axle at 20 and to the frame at 22, and is further connected to the frame by the usual shackle 24 or its equivalent. The disk 10 and member 14 are perforated for a bolt 26 having a retainer 28 confining, in combination with member 14, a coil spring 30 surrounding the bolt. The spring urges the head of the bolt to the left (Figure 4), to urge against disk 10 a second disk 32 of friction material carried by a metal backing 34 integrally extended to form an arm 36 connected by a shackle 38 to a clamp 40 secured to the spring 18 approximately midway between the pivotal connection 22 and the shackle connection 24. Thus the spring must flex against the frictional drag of disks 10 and 32, the amount of the friction being adjusted by tightening more or less a nut 42 engaging the retainer 28.

While one illustrative embodiment of the invention has been described in detail, it is not the intention to limit its scope to that particular embodiment, or otherwise than by the terms of the appended claims.

I claim:

1. A vehicle comprising, in combination, an axle, a chassis frame having a side member, a cantilever spring pivoted at one end to the axle and at an intermediate point to the side member and having a shackle connection with the side member at its opposite end, a friction member secured to the frame, a movable friction member in yielding engagement therewith, and a connection engaging the spring between the two connections to the frame and arranged to be operated by flexing of the spring to rock the movable friction member.

2. A resilient suspension, comprising a supporting member, a supported member, a cantilever spring connected at one end to the supporting member, and at an intermediate point, and at its other end attached to the supported member, a frictional shock absorbing device secured to the supported member and having an operating arm connected to the cantilever spring between the two points of its attachment to the supported member.

3. A resilient suspension for vehicles comprising an axle, a chassis frame having a side member and cantilever spring connected at one end to the axle and at an intermediate point to the side member and also connected with the side member at its opposite end, a friction member secured to the frame, a movable friction member in yielding engagement therewith and a connection engaging the spring between the two connections to the frame and arranged to be operated by flexing of the spring to rock the movable friction member.

In testimony whereof I affix my signature.

C. B. DURHAM.